(12) United States Patent
Mundaragi et al.

(10) Patent No.: US 11,252,018 B2
(45) Date of Patent: Feb. 15, 2022

(54) SERVICE CHAINING WITH SERVICE PATH MONITORING

(71) Applicant: VMWARE, INC., Palo Alto, CA (US)

(72) Inventors: Kantesh Mundaragi, Pune (IN); Rahul Mishra, Palo Alto, CA (US); Pierluigi Rolando, Palo Alto, CA (US); Srinivas Ramaswamy, Palo Alto, CA (US); Yuxiao Zhang, Palo Alto, CA (US); Raju Koganty, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/004,127

(22) Filed: Aug. 27, 2020

(65) Prior Publication Data

US 2022/0006687 A1 Jan. 6, 2022

(30) Foreign Application Priority Data

Jul. 1, 2020 (IN) .............................. 202041027976

(51) Int. Cl.
*H04L 12/707* (2013.01)
*H04L 12/715* (2013.01)
*H04L 12/931* (2013.01)
*H04L 12/24* (2006.01)
*H04L 12/771* (2013.01)
*H04L 12/26* (2006.01)

(52) U.S. Cl.
CPC .......... *H04L 41/0659* (2013.01); *H04L 43/10* (2013.01); *H04L 45/22* (2013.01); *H04L 45/56* (2013.01); *H04L 45/64* (2013.01); *H04L 49/70* (2013.01)

(58) Field of Classification Search
CPC ..... H04L 41/0659; H04L 45/22; H04L 45/56; H04L 43/10; H04L 49/70; H04L 45/64
See application file for complete search history.

(56) References Cited

U.S. PATENT DOCUMENTS

| | | |
|---|---|---|
| 6,262,976 B1 | 7/2001 | McNamara |
| 8,160,055 B1 | 4/2012 | Nadeau et al. |
| 8,355,332 B2 | 1/2013 | Beaudette et al. |
| 8,885,487 B2 | 11/2014 | Voit et al. |
| 9,083,587 B2 | 7/2015 | Babu et al. |
| 9,565,163 B1 | 2/2017 | Arvind et al. |
| 9,893,968 B1 | 2/2018 | Nagargadde et al. |
| 10,212,161 B1 | 2/2019 | Schaefer et al. |
| 10,582,274 B2 | 3/2020 | Kwak et al. |

(Continued)

*Primary Examiner* — Mohamed A Kamara
(74) *Attorney, Agent, or Firm* — Su IP Consulting

(57) ABSTRACT

Example methods and systems for failure handling for service chaining with service path monitoring. One example may comprise a first computer system detecting a data packet that is being forwarded along a first service path. The first computer system may configure a liveness check query and send the liveness check query along with the data packet towards a service virtualized computing instance to cause a liveness check response. In response to detecting the liveness check response from the service virtualized computing instance, the first computer system may determine that the service virtualized computing instance is available. Otherwise, report information may be generated and sent to trigger a switch from the first service path to a second service path that excludes the service virtualized computing instance.

21 Claims, 7 Drawing Sheets

(56) References Cited

U.S. PATENT DOCUMENTS

| | | |
|---|---|---|
| 10,637,758 B2 | 4/2020 | Dongre et al. |
| 10,931,552 B1* | 2/2021 | Zhang ................. H04L 43/0811 |
| 2011/0222413 A1 | 9/2011 | Shukla et al. |
| 2016/0226766 A1* | 8/2016 | Al-Zoubi ................. H04L 45/64 |
| 2020/0021518 A1* | 1/2020 | Yan ......................... H04L 69/22 |
| 2020/0296026 A1* | 9/2020 | Michael ................. H04L 43/08 |

* cited by examiner

SERVICE CHAINING WITH SERVICE PATH MONITORING

RELATED APPLICATIONS

Benefit is claimed under 35 U.S.C. 119(a)-(d) to Foreign Application Serial No. 202041027976 filed in India entitled "SERVICE CHAINING WITH SERVICE PATH MONITORING", on Jul. 1, 2020, by VMware, Inc., which is herein incorporated in its entirety by reference for all purposes.

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, a service chain may be deployed to provide a range of services to other virtualized computing instances in the SDN environment. However, service chaining operations might be affected by various issues, which in turn affect the performance of hosts and VMs.

DETAILED DESCRIPTION

Figure 1:
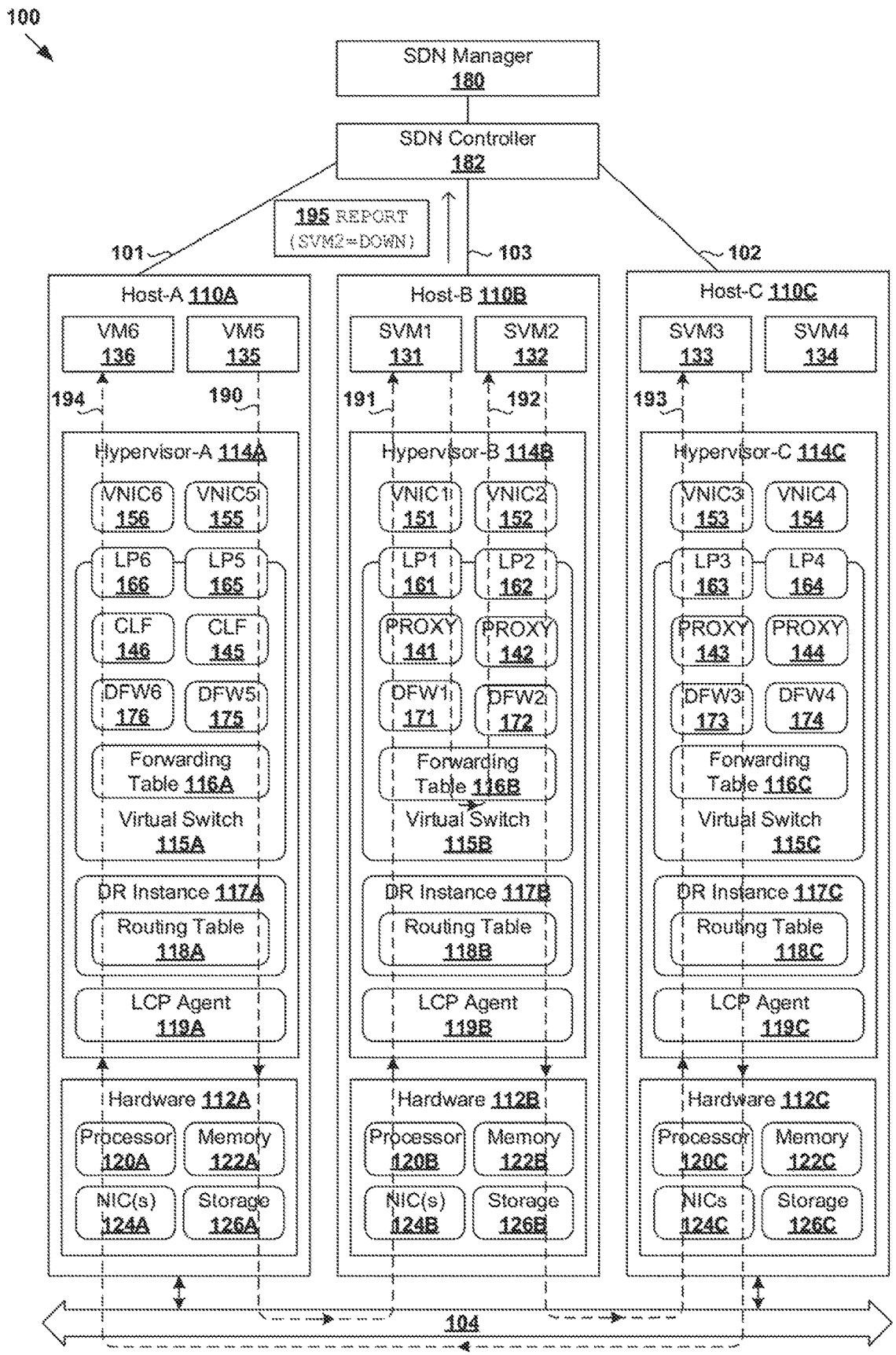
FIG. 1 is a schematic diagram illustrating an example software-defined networking (SDN) environment in which service chaining with service path monitoring may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It should be understood that aspects of the present disclosure, as generally described herein, and illustrated in the drawings, may be arranged, substituted, combined, and designed in a wide variety of different configurations, all of which are explicitly contemplated herein. The terms "first," "second" and "third" are used throughout the present disclosure to distinguish one element from another. These elements should not be limited by these terms. A first element may be referred to as a second element, and vice versa.

Challenges relating to service chaining will now be explained in more detail using FIG. 1, which is a schematic diagram illustrating example software-defined networking (SDN) environment 100 in which service chaining with service path monitoring may be performed. Depending on the desired implementation, SDN environment 100 may include additional and/or alternative components than that shown in FIG. 1. SDN environment 100 includes multiple hosts 110A-C that are inter-connected via physical network 104. In practice, SDN environment 100 may include any number of hosts (also known as a "host computers", "host devices", "physical servers", "server systems", "transport nodes," etc.), where each host may be supporting tens or hundreds of virtual machines (VMs).

Each host 110A/110B/110C may include suitable hardware 112A/112B/112C and virtualization software (e.g., hypervisor-A 114A, hypervisor-B 114B, hypervisor-C 114C) to support various VMs. For example, hosts 110A-C may support respective VMs 131-136. Hypervisor 114A/114B/114C maintains a mapping between underlying hardware 112A/112B/112C and virtual resources allocated to respective VMs. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). The virtual resources may include virtual CPU, guest physical memory, virtual disk, virtual network interface controller (VNIC), etc. Hardware resources may be emulated using virtual machine monitors (VMMs). For example in FIG. 1, VNICs 151-156 are virtual network adapters for VMs 131-136, respectively, and are emulated by corresponding VMMs (not shown for simplicity) instantiated by their respective hypervisor at respective host-A 110A, host-B 110B and host-C 110C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical port. For example, logical switch ports 161-166 (see "LP1" to "LP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

To protect VMs 131-136 against security threats caused by unwanted packets, hypervisors 114A-C may implement firewall engines to filter packets. For example, distributed firewall engines 171-176 (see "DFW1" to "DFW6") are configured to filter packets to, and from, respective VMs 131-136 according to firewall rules. In practice, network packets may be filtered according to firewall rules at any point along a datapath from a VM to corresponding physical NIC 124A/124B/124C. In one embodiment, a filter component (not shown) is incorporated into each VNIC 151-156 that enforces firewall rules that are associated with the endpoint corresponding to that VNIC and maintained by respective distributed firewall engines 171-176.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (Geneve), etc. For example, VXLAN is a layer-2 overlay scheme on a layer-3 network that uses tunnel encapsulation to extend layer-2 segments across multiple hosts which may reside on different layer 2 physical networks.

SDN manager 180 and SDN controller 182 are example network management entities in SDN environment 100. One example of an SDN controller is the NSX controller component of VMware NSX® (available from VMware, Inc.) that operates on a central control plane. SDN controller 182 may be a member of a controller cluster (not shown for simplicity) that is configurable using SDN manager 180 operating on a management plane (MP). Network management entity 180/182 may be implemented using physical machine(s), VM(s), or both. Logical switches, logical routers, and logical overlay networks may be configured using SDN controller 182, SDN manager 180, etc. To send or receive control information, local control plane (LCP) agent 119A/119B/119C on host 110A/110B/110C may interact with SDN controller 182 via control-plane channel 101/102/103.

Hosts 110A-C may maintain data-plane connectivity among themselves via physical network 104 to facilitate communication among VMs. Hypervisor 114A/114B/114C may implement a virtual tunnel endpoint (VTEP) (not shown) to encapsulate and decapsulate packets with an outer header (also known as a tunnel header) identifying the relevant logical overlay network (e.g., using a VXLAN or "virtual" network identifier (VNI) added to a header field). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B), hypervisor-C 114C implements a third VTEP with (IP-C, MAC-C, VTEP-C), etc. Encapsulated packets may be sent via a tunnel between a pair of VTEPs over physical network 104, over which respective hosts are in layer-3 connectivity with one another.

In SDN environment 100, multiple (N) abstract service functions to be performed on packets may be chained or grouped together to form a "service chain." A service chain (also known as "service function chain") may be represented using $S=\{F_j\}$, where $F_j$ is the $j^{th}$ service function and $j=1, \ldots, N$ to implement a sequence of $N \geq 2$ services. For example in FIG. 1, service nodes or service endpoints such as service VMs (SVMs) 131-134 may be deployed to implement to perform various service functions (e.g., defined using service profiles). In practice, a service chain may be identified using a service chain identifier (SCID). Within a service chain, a service path may be uniquely identified using a service path identifier (SPI). In general, a service path may represent an embodiment of the service chain, the service path being formed by embedding the service chain into a topology of a data center. A service index (SI) specifies a location or hop within a service path. In the example in FIG. 1, a service chain may include a first service path with SPI=1 that includes service functions performed by set={SVM1, SVM2, SVM3} in a pre-defined order. Within the first service path, a first service is provided by SVM1 131 assigned with SI=3, a second service by SVM2 132 with SI=2 and a third service by SVM3 133 with SI=1.

Using service chaining, service insertion may be implemented for packets between a source and a destination in SDN environment 100, such as for east-west traffic between two VMs (e.g., VM5 135 and VM6 136) and/or north-south traffic between a VM and an external endpoint. In practice, however, service chains may be affected by various network issues, such as software and/or hardware failures that render SVMs 131-134 unavailable. In general, troubleshooting packet forwarding paths is generally not a trivial task, especially when service insertion is involved. One reason is that service insertion is generally implemented using multiple SVMs that are deployed on various hosts. As SDN environment 100 increases in scale and complexity, any difficulty involved in troubleshooting and diagnosis may lead to increased system downtime and impact the performance of VMs 135-156 requiring service insertion.

Service Chaining with Service Path Monitoring

According to examples of the present disclosure, service path monitoring may be implemented to improve the performance and fault tolerance of service chains. For example, an "in-band" approach that takes advantage of data packets travelling on a data plane to detect the liveness of SVMs 131-134. The in-band approach should be contrasted against out-of-band approaches that usually necessitate the use of special packets and/or dedicated protocol stack that is not part of normal packet delivery. Compared to out-of-band approaches that increase the system processing load (possibly when it is already loaded), examples of the present disclosure may be implemented more efficiently.

As used herein, the term "service chain" may refer generally to a chain or group of service functions to be performed on packets travelling between a source and a destination. The term "service path" may refer generally to a path within a network topology through which packets are steered for processing according to a service chain. A service path (also known as "service function path") may include at least one "service node," "service endpoint," "service instance" or "service virtualized computing instance" configured to provide a "service." Any suitable "service" may be provided by applications running on respective SVMs 131-134. For example, a service may be a networking or non-networking, such as firewall, load balancing, network address translation (NAT), intrusion detection system (IDS), intrusion prevention system (IPS), deep packet inspection (DPI), traffic shaping, traffic optimization, packet header enrichment or modification, packet tagging, content filtering, etc. It should be understood that the operation(s) associated with a service may or may not modify the content (e.g., header(s) or payload) of the packets.

Examples of the present disclosure may be implemented using any suitable module(s), such as service insertion proxies 141-144 (labelled "PROXY") associated with respective SVMs 131-134, and service insertion classifiers (labelled "CLF") 145-146 associated with respective guest VMs 135-136. Using the example in FIG. 1, service chaining may be implemented using a first service path that includes SVM1 131, SVM2 132 and SVM3 133. For example, data packets (see 190) that originate from source VM5 135 may be steered towards SVM1 131 (see 191) followed by SVM2 132 (see 192) and SVM3 133 (see 193) located on the first service path for processing. After being processed (and not dropped), the data packets may be forwarded towards destination VM6 136 (see 194). Using examples of the present disclosure, hosts 110B-C may monitor the availability or liveness of SVMs 131-134, if a particular SVM becomes unavailable, an alternative service path may be used.

Figure 2:
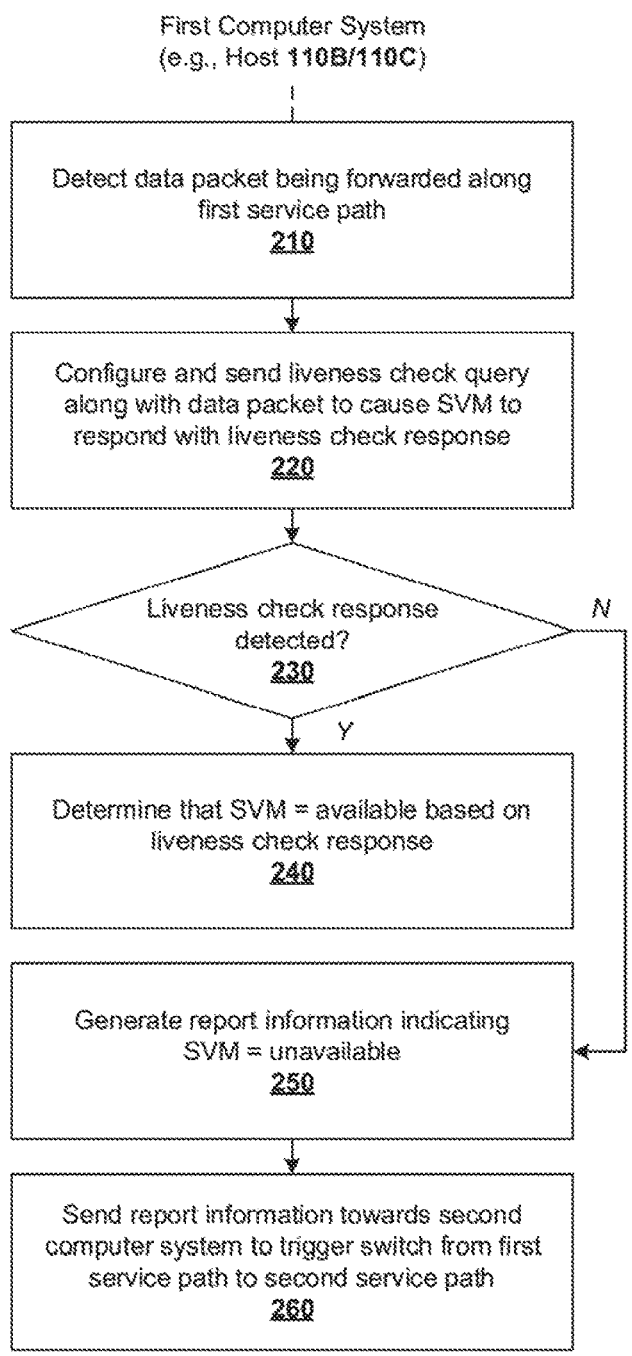
FIG. 2 is a schematic diagram illustrating an example service chain with multiple service paths in an SDN environment.

In more detail, FIG. 2 is a flowchart of example process 200 for a first computer system to perform service chaining with service path monitoring in SDN environment 100. Example process 200 may include one or more operations, functions, or actions illustrated by one or more blocks, such as 210 to 260. The various blocks may be combined into fewer blocks, divided into additional blocks, and/or eliminated depending on the desired implementation. In the following, various examples will be described using host-B 110B as "first computer system," management entity 180/182 as "second computer system," SVM2 132 as "service virtualized computing instance" located on a first service path, VM5 135 as "source virtualized computing instance" and VM6 136 as "destination virtualized computing instance."

At 210 and 220 in FIG. 2, in response to detecting a data packet that is being forwarded along a first service path, host-B 110B (e.g., using proxy 142) may configure and send a liveness check query along with the data packet towards SVM2 132. The data packet may include service header information identifying the first service path, such as (SPI=1, SI=2). The liveness check query may be configured to cause SVM2 132 to respond with a liveness check response. At 230 and 240, in response to detecting the liveness check response, SVM2 132 may be determined to be available. Otherwise, at 250 and 260, in response to detecting an absence of the liveness check response, report information (see 195 in FIG. 1) may be generated and sent to a "second computer system," such as management entity 180/182, host 110A supporting VMs 135-136, host-C 110C supporting SVMs 133-134, etc.

As will be described further using FIGS. 3-7, the liveness check query at block 220 may be configured by setting a dedicated flag (e.g., PING_BIT) in the data packet or metadata associated with the data packet. The liveness check query may be configured to cause SVM2 132 to respond regardless of whether the data packet is (eventually) dropped by SVM2 132. The liveness check query may also be configured to include a sequence number for identifying the liveness check query to which SVM2 132 is responding. Report information 195 at block 250 may indicate that SVM2 132 is unavailable to trigger a switch from the first service path to a second service path that excludes SVM2 132. Using examples of the present disclosure, an in-band approach for service path monitoring may be triggered by traffic to reduce any special processing of probes that are separate from regular data packets. During intervals of substantially no traffic, out-of-band liveness checks may also be triggered periodically to proactively probe the health of SVMs 131-134.

Figure 3:
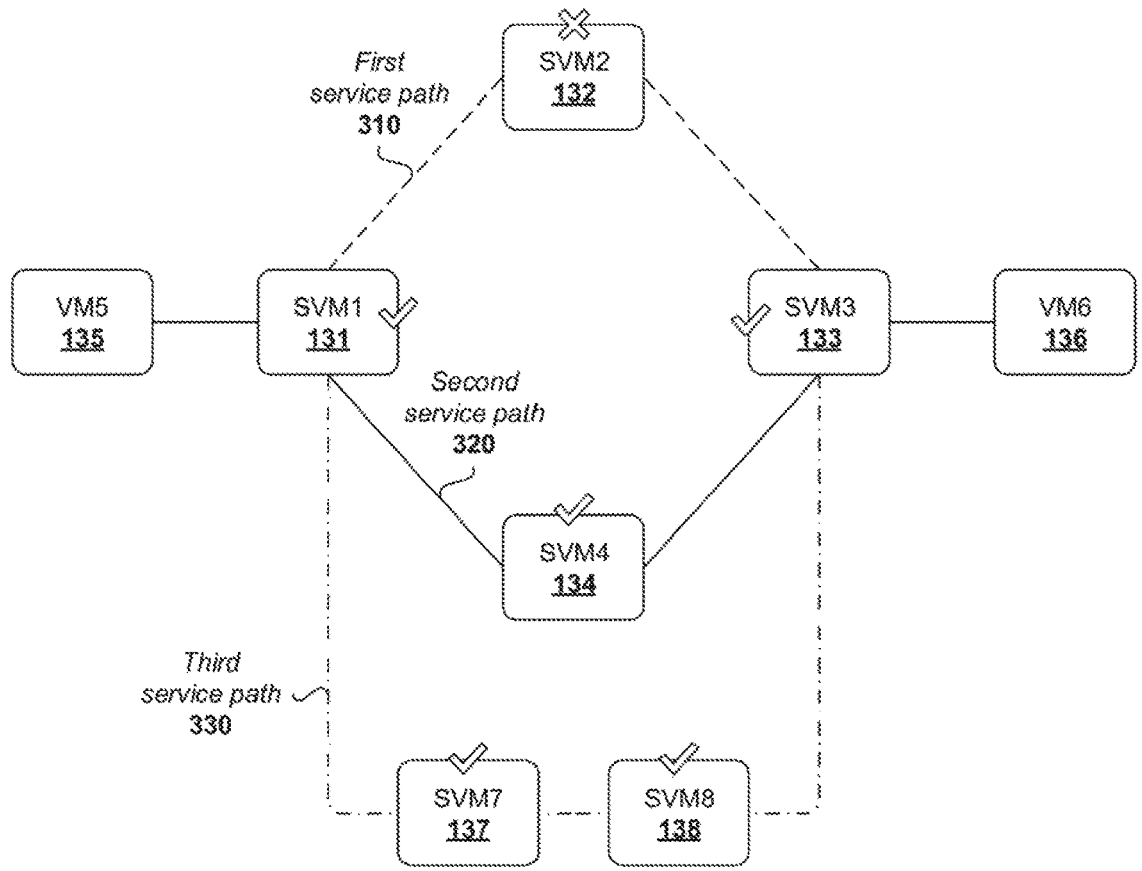
FIG. 3 is a flowchart of an example process for a first computer system to perform service chaining with service path monitoring in an SDN environment.

Some example service paths are shown in FIG. 3, which is a schematic diagram illustrating example service chain 300 with multiple service paths in SDN environment 100. Note any alternative and/or additional service paths and corresponding SVMs may be deployed to improve fault tolerance. In the example in FIG. 3, service chain 300 may include multiple service paths, each having a different set of SVMs. At 310, a first service path with SPI=1 may include {SVM1, SVM2, SVM3}. At 320, a second service path with SPI=2 may include {SVM1, SVM4, SVM3} by replacing SVM2 132 with SVM4 134. At 330, a third service path with SPI=3 may include {SVM1, SVM7, SVM8, SVM3} using SVM7 137 and SVM8 138.

Using the example in FIG. 3, a data packet from source VM5 135 may be steered towards one of service paths 310-330 before being sent towards destination VM6 136. Note that, after being processed using service path 310/320/330, it is not necessary to forward the data packet directly from an SVM (e.g., SVM3 133 or SVM8 138) to destination VM6 136. In scenarios where the service plane is orthogonal to the regular data forwarding plane, the processed data packet may be forwarded from the SVM towards source VM5 135 before being switched or routed towards destination VM6 136. Also, in practice, source VM5 135 and destination VM6 136 may be supported by different hosts.

When SVM2 132 is detected to be unavailable, corresponding first service path 310 also becomes unavailable. In practice, SVM2 132 may fail to respond with a liveness check response for various reasons, such as hardware failure, software failure, malicious attack, invalid configuration, VNIC reboot, a combination thereof, etc. In this case, report information 195 may be generated and sent to trigger a switch from first service path 310 to an alternative service path that excludes SVM2 132, such as second service path 320 or third service path 330.

Based on report information regarding the availability of SVMs 131-134, management entity 180/82 may maintain status information (see 340) associated with service chain 300 and invalidate any service path 210/220/230 that has become unavailable (see 341-343). When SVM2 132 fails, service insertion traffic may be steered towards an alternative service path that is available (status=UP), instead of blackholing service insertion traffic at a failed SVM or skipping certain service(s). To review status information 340 associated with service chain 300, a user may access any suitable user interface supported by SDN manager 180.

Using examples of the present disclosure, service path monitoring may be implemented over data-plane interface using data packets, such as to catch full-stack errors, including interface misconfigurations and failures, etc. This way, SVMs 131-133 may be process the data packets using regular packet processing paths in a more efficient manner. The in-band approach should be contrasted against approaches that rely on special probes, which require separate processing from regular data packets. Further, special probes might not be reliable. In some cases, regular data packets might work when the special probes fail, or vice versa. Various examples will be explained below using FIGS. 4-7.

Service Insertion Using First Service Path

Figure 4:
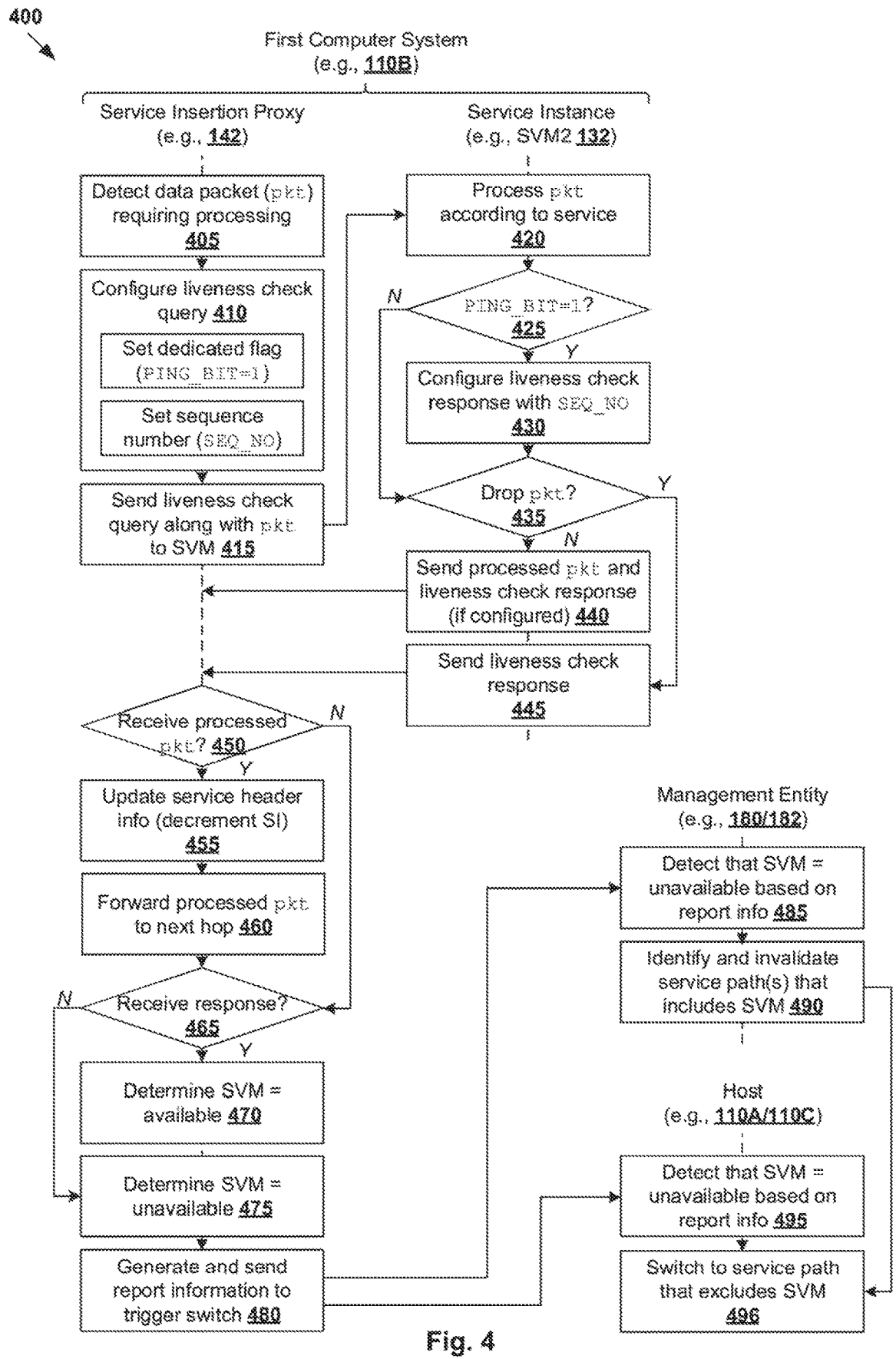
FIG. 4 is a flowchart of an example detailed process for service chaining with service path monitoring.

FIG. 4 is a flowchart of example process 400 for service chaining with service path monitoring in SDN environment 100. Example process 400 may include one or more operations, functions, or actions illustrated by one or more blocks, such as 405 to 496. The various blocks may be combined into fewer blocks, divided into additional blocks, and/or eliminated depending on the desired implementation. The example in FIG. 4 will be explained using FIG. 5, which is a schematic diagram illustrating first example 500 of service chaining with service path monitoring in SDN environment 100.

In the following, various examples will be explained using first service path 310 and service insertion proxies 141-143 (or more simply "proxies"). In practice, proxies 141-143 may be deployed as part of a virtual service insertion platform (VSIP) that monitors the liveness (e.g., responsiveness, presence, operation) of service chain 300 in FIG. 3. One role of proxies 141-143 is to handle data packets that are steered towards respective SVMs 131-133 for processing. For example, proxies 141-143 may encapsulate data packets and their metadata in a format that SVMs 131-133 understand. Another role of proxies 141-143 is to perform liveness check for respective SVMs 131-133 to facilitate service path monitoring as follows.

(a) Service Insertion Classifier 145

Figure 5:
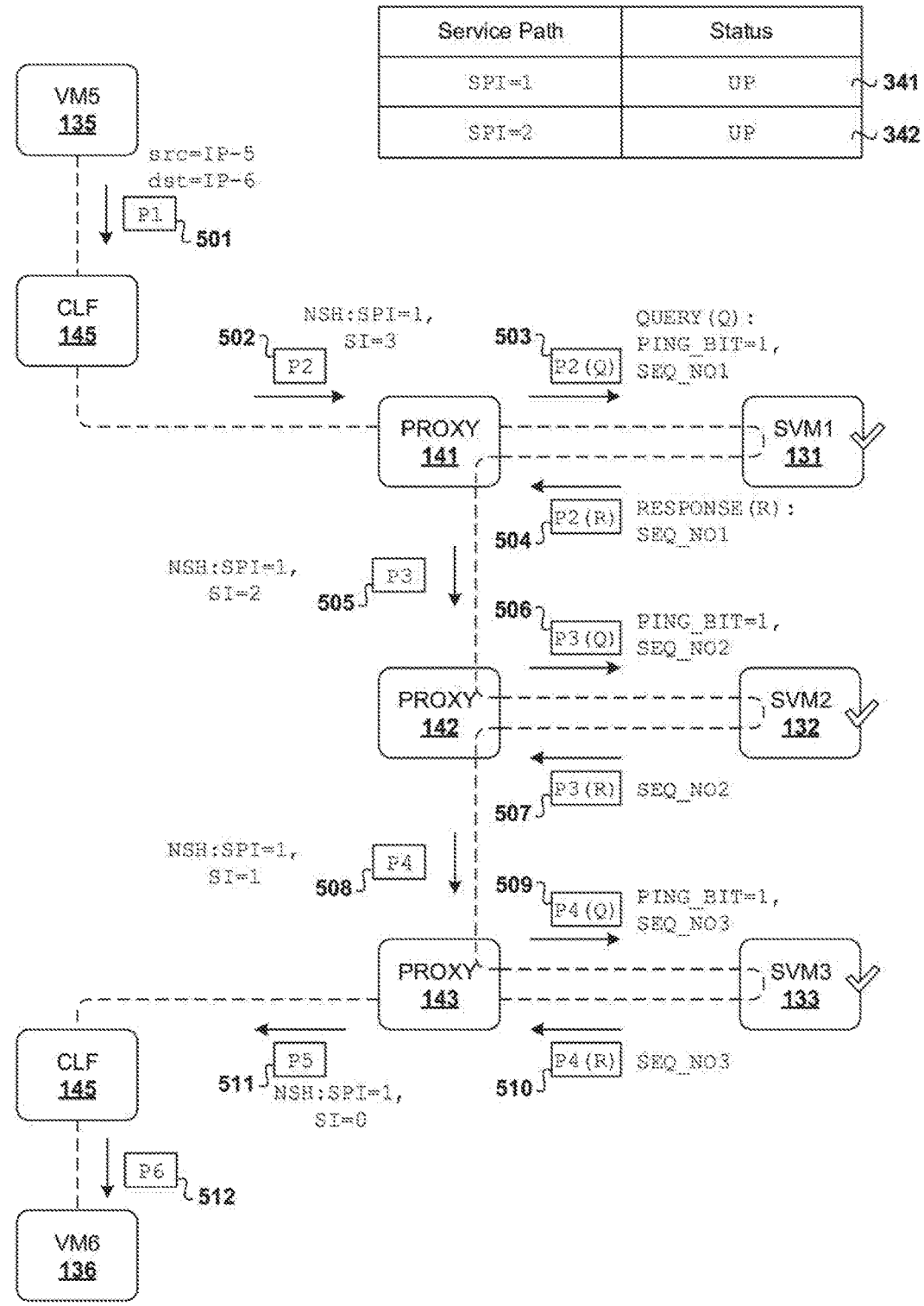
FIG. 5 is a schematic diagram illustrating a first example of service chaining with service path monitoring in an SDN environment.

At 501 in FIG. 5, source VM5 135 may generate and sent a data packet (see "P1" 501) that is addressed from source IP address=IP-VM5 to destination IP address=IP-VM6 associated with VM6 136. In response to detecting "P1" 501, service insertion classifier 145 may select first service path 310 according to a service insertion policy that is applicable to "P1" 501. In practice, the a "service insertion policy" may refer generally to a rule (e.g., table entry) specifying match field(s) to be matched to characteristic(s) of a packet, and an action that is performed when a match is found. Any suitable characteristic(s) may be matched, such as five-tuple information (e.g., source IP address and port number, destination IP address, port number and protocol).

At 502 in FIG. 5, service insertion classifier 145 may generate "P2" 502 by encapsulating "P1" 501 with any suitable service header information. One example is network service header (NSH) encapsulation as defined by Internet Engineering Task Force (IETF) standards, such as Request for Comments (RFC) 8300 entitled "Network Service Header (NSH)" that is incorporated herein by reference. In this case, an NSH may be inserted between a transport header and payload of a data packet to enable it to traverse first service path 310 of service chain 300. The service header information (see "NSH" in FIG. 5) may include SPI=1 identifying first service path 310, SI=3 identifying SVM1 131 (i.e., first hop) on first service path 310 and a time-to-live (TTL) value (not shown). As will be described below, SI may be decremented at each SVM along the service path.

The resulting packet "P2" 502 may be forwarded towards SVM1 131 supported by host-B 110B. Depending on the desired implementation, host-A 110A and host-B 110B may be connected via a logical overlay network. In this case, to reach SVM1 131 supported by host-B 110B, "P2" 502 may be encapsulated with an outer header (e.g., Geneve encapsulation) specifying source VTEP information (VTEP IP address=IP-A) and destination VTEP information (VTEP IP address=IP-B) associated with respective host-A 110A and host-B 110B.

(b) First Proxy 141 and SVM1 131

At 503 in FIG. 5, in response to detecting "P2" 502, first proxy 141 associated with SVM1 131 may send the data packet along with a liveness check query towards SVM1 131 via VNIC1 151. See "P2(Q)" in FIG. 5, where "Q" represents the liveness check query. First proxy 141 may configure the liveness check query by setting a dedicated flag (e.g., PING_BIT=1) in metadata associated with "P2" 502. First proxy 141 may also include a sequence number=SEQ_NO1 (e.g., 6 bits with 64 possible values) in the liveness check query to distinguish different requests sent within a timeframe. See corresponding 405, 410 and 415 in FIG. 4.

In practice, the flag (e.g., PING_BIT) and sequence number may be configured as part of a packet's service header information (see "NSH" in FIG. 5), such as in a fixed-length context (FLC) header using metadata (MD) type 1 format defined in RFC 8300 mentioned above, etc. The liveness check query (e.g., PING_BIT=1) is configured to cause SVM1 131 (if alive) to respond with a liveness check response, even when "P2" 502 is dropped. For example, the PING_BIT may be used to "ping" a virtual interface associated with SVM1 131 to determine whether SVM1 131 is alive. The PING_BIT is configured to force SVM1 131 to respond to first proxy 141. Depending on the desired implementation, a particular SVM may be determined to be alive if the SVM is responding on a regular basis (e.g., at least once within a predetermined time period).

At 504 in FIG. 5, SVM1 131 may perform any suitable packet processing and configure a liveness check response regardless of whether the data packet is dropped. See "P2(R)" in FIG. 5, where "R" represents a response. See 420, 425 and 430 in FIG. 4. In particular, if the data packet is not dropped after processing, the processed data packet may be sent along with the liveness check response according to block 440 in FIG. 4. Otherwise, if there is a packet drop, only the liveness check response will be sent according to block 445 in FIG. 4. In some cases, blocks 440-445 may happen together with the same packet, such as when SVM1 131 replies using an in-band approach.

In practice, SVMs 131-133 located on first service path 310 generally return most packets it receives and therefore may be detected as alive by respective proxies 141-143. However, for various reasons, SVMs 131-133 may stop sending traffic. One example is when SVMs 131-133 have not received any data packets that require processing. Another example is when SVMs 131-133 is providing a network service that drops all packets on purpose, such as according to a copy-made configuration (e.g., SVM is configured to receive a copy of data packets), a firewall rule for security reasons, etc. By setting PING_BIT=1, SVM1 131 is forced to respond.

The liveness check response may include sequence number=SEQ_NO1 that is included in the corresponding liveness check query. In the event that SVM1 131 responds to the same query repeatedly due to a malfunction, only one response is considered to be valid. Due to occasional loss at SVM1 131 (e.g., full queues on VNIC1 151), SVM1 131 may only respond to the most recent liveness check query. The occasional loss may be tolerated to reduce false positives. In the event of a packet drop, the liveness check response may be any suitable packet that indicates that SVM1 131 is alive and responding to an earlier liveness check query with SEQ_NO1. It is not necessary for the liveness check response to have the same format as the liveness check query.

At 505 in FIG. 5, first proxy 141 may generate and send packet "P3" 505 by decrementing SI (i.e., from 3 to 2) to update the service header information in packet "P2" 502. Packet "P3" 505 may be forwarded towards the next hop=SVM2 132 along first service path 310. Since SVM2 132 is also supported by host-B 110B, encapsulation is not required. See 450 (yes), 455 and 460 in FIG. 4. Based on the liveness check response from SVM1 131, first proxy 141 may determine that SVM1 131 is available (i.e., alive or status=UP). See 465 (response detected) and 470 in FIG. 4.

(c) Second Proxy 142 and SVM2 132

Similarly, at 506 in FIG. 5, in response to detecting "P3" 505, second proxy 142 associated with SVM2 132 may send the data packet along with a liveness check query towards SVM2 132 via VNIC1 151. See "P3(Q)" in FIG. 5, which includes PING_BIT=1 and SEQ_NO2. At 507, SVM2 132 may perform packet processing and respond with a liveness check response. See "P3(R)" in FIG. 5.

At 508 in FIG. 5, second proxy 142 may generate and send packet "P4" 508 by decrementing SI (i.e., from 2 to 1). Packet "P4" 508 may be forwarded towards the next hop=SVM3 133 along first service path 310. Since SVM3 133 is supported by host-C 110C, "P4" 508 may be encapsulated with an outer header specifying (source VTEP IP-B, destination VTEP IP-C) associated with respective host-B 110B and host-C 110C. Based on the liveness check response that includes SEQ_NO2 from SVM2 132, second proxy 142 may determine that SVM2 132 is available.

(d) Third Proxy 143 and SVM3 133

Similarly, at 509 in FIG. 5, in response to detecting "P4" 508, third proxy 143 associated with SVM3 133 may send the data packet along with a liveness check query towards SVM3 133 via VNIC1 151. See "P4(Q)" in FIG. 5, which includes PING_BIT=1 and SEQ_NO3. At 511 in FIG. 5, SVM3 133 may perform packet processing and respond with a liveness check response denoted as "P4(R)."

At 510 in FIG. 5, third proxy 143 may generate and send packet "P5" 511 by decrementing SI (i.e., from 1 to 0). Since SVM3 133 is the final hop on first service path 310, packet "P5" 511 may be forwarded towards destination=VM6 136. In cases where the service plane is orthogonal to the regular data forwarding plane, SVM3 133 may forward packet "P5" 511 towards source VM5 135 to cause host-A 110A to switch or route the packet towards destination VM6 136. To reach host-A 110A, packet "P5" 511 may be encapsulated with an outer header specifying (source VTEP IP-C, destination VTEP IP-A) associated with respective host-C 110C and host-A 110A. At destination VM6 136, packet "P4" 540 may be processed by service insertion classifier 146, which removes any service header information before forwarding packet "P6" 512 towards VM6 136 via VNIC6 156.

Note that it is not necessary for service proxies 141-143 to send a liveness check query for every data packet that requires processing by respective SVMs 131-133. For example, a periodic timer (e.g., thread that is separate from a fast processing path) may be configured to initiate a liveness check within a predetermined period of time (e.g., every k milliseconds). The above implementation details relating to first proxy 141 and SVM1 131 may also apply to second proxy 142, third proxy 143 and corresponding SVMs 131-133. Further, as discussed using FIG. 2, liveness checks may be performed during intervals of no traffic using an out-of-band approach. In this case, the periodic timer alone may trigger service proxies 141-143 to send a liveness check query towards respective SVMs 131-133.

Switching to Second Service Path

Figure 6:
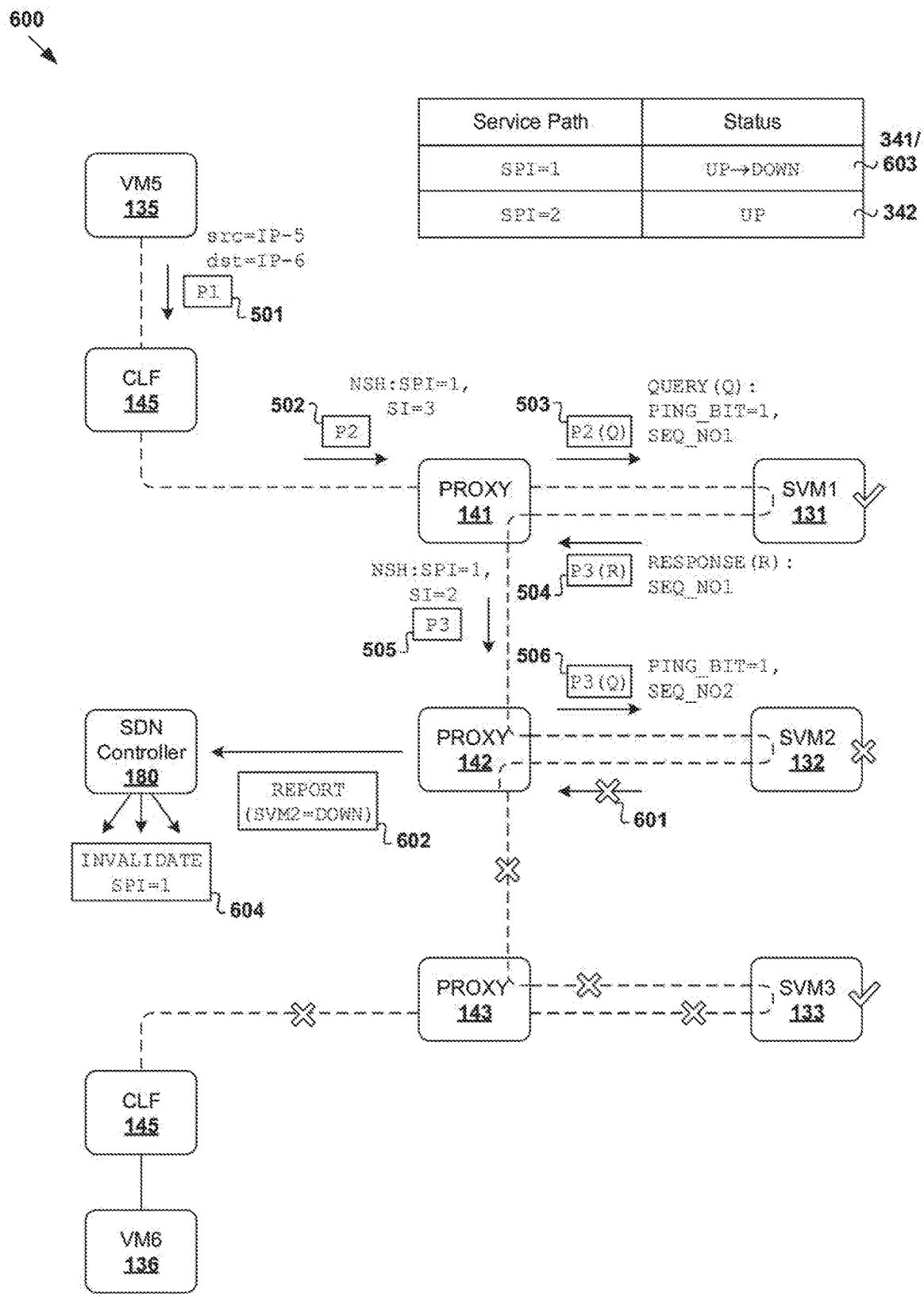
FIG. 6 is a schematic diagram illustrating a second example of service chaining with service path monitoring in an SDN environment.

FIG. 6 is a schematic diagram illustrating second example 600 of service chaining with service path monitoring in SDN environment 100. Packets 501-506 in FIG. 6 are similar to that in FIG. 5, the explanation of which will not be repeated here for brevity. However, unlike the example in FIG. 5, SVM2 132 on host-B 110B has become unavailability. In this case, no liveness check response is received from SVM2 132.

(a) Failure at SVM2 132

At 601 in FIG. 6, in response to detecting an absence of the liveness check response, second proxy 142 on host-B 110B may determine that SVM2 132 is unavailable (i.e., not alive or status=DOWN). At 602, second proxy 142 may generate and send report information to SDN controller 182. The report information may indicate that SVM2 132 is unavailable to trigger a switch to an alternative service path. The control information may identify a universally unique identifier (UUID) associated with SVM2 132 and its status=DOWN. See also 465 (no response), 475 and 480 in FIG. 4.

In practice, SVM2 132 may be assumed to be unavailable when, for example, no response is received after sending a predetermined number of liveness check queries, or no traffic from SVM2 132 within a predetermined duration. The report information may be sent using any suitable approach, such as using LCP agent 119B residing in a user space to generate a message indicating a virtual interface (VIF) associated with SVM2 132 is down. In this case, the control information may be "sent" by writing the message to a data store and "received" when the message is accessed by SDN controller 182.

(b) Failure Handling at SDN Controller 182

At 603 in FIG. 6, based on the report information from second proxy 142, SDN controller 182 on the central control plane may detect a failure associated with SVM2 132 and first service path 310. Status information 340 maintained by SDN controller 182 may be updated to invalidate first service path 310, such as from status=UP to DOWN. See blocks 485-490 in FIG. 4.

At 604 in FIG. 6, SDN controller 182 may generate and send control information to relevant hosts to invalidate first service path 310, including host-A 110A using SVM2 132, host-B 110B supporting SVM2 132 and SDN manager 180. The control information may be sent to hosts 110A-C via respective LCP agents 119A-C, thereby triggering a switch (see 720 in FIG. 7) from first service path 310 to second service path 320.

Based on the control information, service insertion classifiers 145-146 may update their flow table information. This may involve invalidating or deleting any service insertion rule that directs traffic towards first service path 310. Service insertion rule or rules that direct traffic towards second service path 320 may be applied during subsequent service insertion. See blocks 495-496 in FIG. 4. Although not shown in FIG. 6, note that there might be multiple service paths that include SVM2 132. In this case, each of the affected service paths may be invalidated based on the failure associated with SVM2 132.

Depending on the desired implementation, block 480 may involve generating and sending report information to source host-A 110A to indicate that SVM2 132 is unavailable for service insertion. In one example, the "report information" may be sent by reflecting packet "P3" 505 back to source VM5 135. A special action (e.g., failed) may also be included in an action field of the metadata of packet "P3" 505. Based on the reflected packet, service insertion classifier 145 may identify a failure associated with first service path 310 and reprogram its flow tables accordingly. This form of data-plane notification is generally more reactive. SDN controller 185 might have a slower reaction (e.g., within a few seconds), causing more data packets to be directed towards failed SVM2 132 before a switch is triggered.

(c) Service Insertion Using Second Service Path

Figure 7:
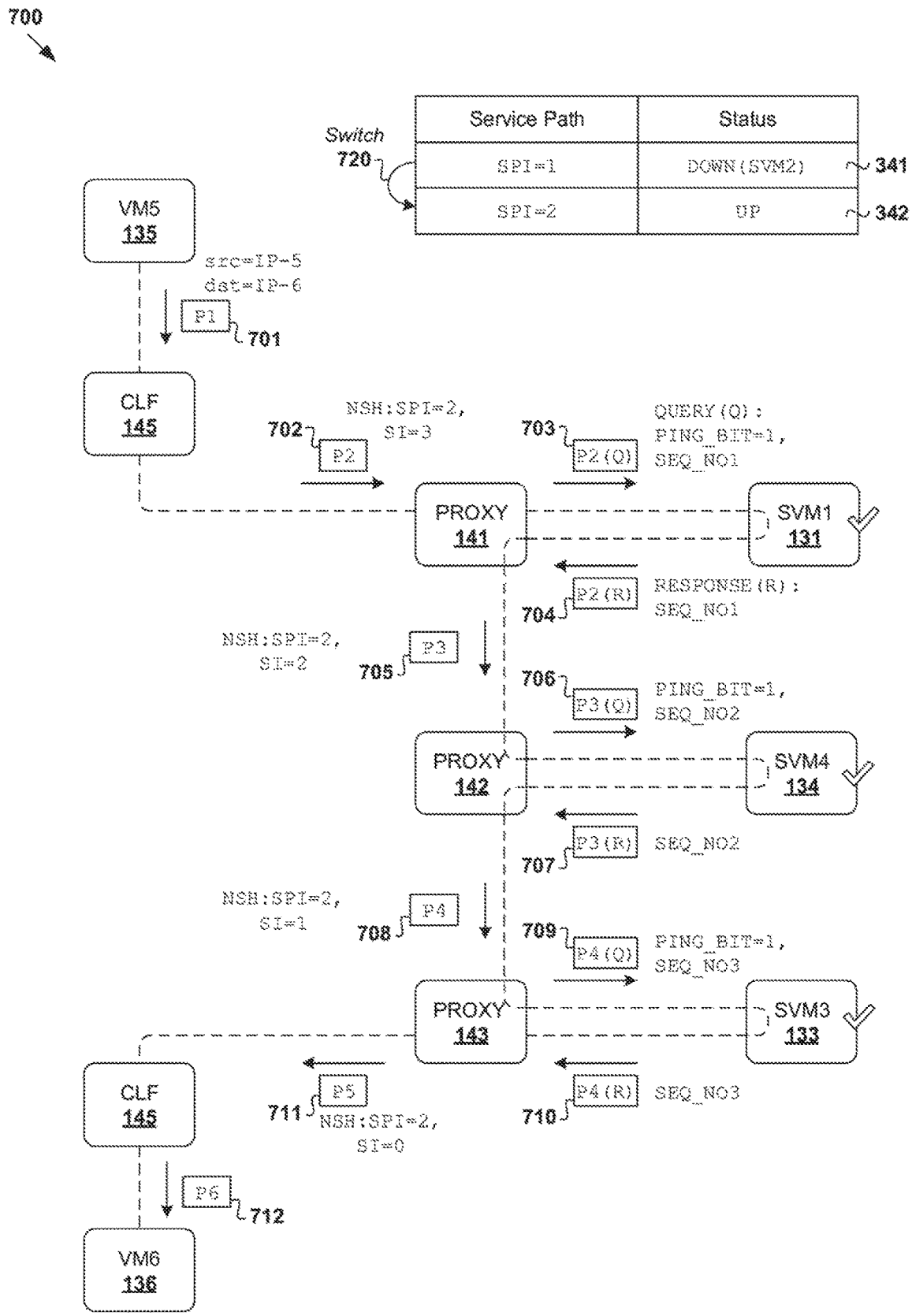
FIG. 7 is a schematic diagram illustrating a third example of service chaining with service path monitoring in an SDN environment.

FIG. 7 is a schematic diagram illustrating third example 700 of service chaining with service path monitoring in SDN environment 100. In this case, service insertion classifier 145 associated with source VM5 135 may steer subsequent data packets towards second service path 320 for processing. Packets 701-712 may be processed in a similar manner to packets 501-512 in FIG. 5, the explanation of which will not be repeated here for brevity.

Since first service path 310 has been invalidated, first proxy 141 may generate and send packet "P3" 705 to SVM4 134 located on second service path 320 assigned with SPI=2. In practice, SVM4 134 may be configured to provide the same or a similar service compared to SVM2 132. Once packet processing is completed by SVM4 134, proxy 144 may update the relevant service header information and forward packet "P4" 708 towards next hop=SVM3 133. Along second service path 320, proxy 141/144/143 may perform liveness check for corresponding SVM 131/134/133.

According to examples of the present disclosure, liveness check may be performed in a substantially in-band manner using regular packet delivery. Both liveness check queries and responses may be carried in-band on the same data VNIC via which data packets are forwarded. This way, liveness check queries and responses may be piggybacked on data packets, thereby reducing or eliminating any overhead in terms of bandwidth and packets per second especially when SVMs 131-144 are loaded.

Multiple Failure Detection Mechanisms

In practice, various mechanisms for failure detection may be implemented. According to a data-plane mechanism, the examples in FIGS. 1-7 may be implemented to perform liveness checks and service path monitoring. According to a central control plane mechanism, a data interface associated with a particular SVM (e.g., SVM2 132) may be monitored. If the data interface is disconnected, the SVM may be determined to be unavailable for packet processing. In this case, SDN controller 182 may instruct host-B 110B to power off SVM2 132. According a management-plane mechanism, manual intervention by users (e.g., network administrators) may be supported by SDN manager 180 via any suitable interface. This allows users to intentionally fail SVM2 132 when a misbehavior is detected, etc.

In practice, status information 340 associated with SVMs 131-134 may be verified based on multiple detection mechanisms. For example, SVM2 132 may be considered to be unavailable if failure is detected using one mechanism. SVM2 132 may be determined to be alive based on multiple mechanisms. Further, examples of the present disclosure may be implemented together with other approaches for connectivity checks. One example is described in related and commonly owned U.S. application Ser. No. 16/813,775, entitled "Connectivity Check with Service Insertion," which is incorporated herein by reference. Using this approach, a connectivity check packet may be injected at a source host to cause observation points along a service path to report any connectivity issue(s) to management entity 180/182.

Container Implementation

Although explained using VMs 131-136, SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (i.e., "containers-on-VM") not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as host 110A/110B/110C may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a first computer system to perform service chaining with service path monitoring, wherein the first computer system supports a service virtualized computing instance and the method comprises:

detecting a data packet that is being forwarded along a first service path of a service chain that includes the service virtualized computing instance, wherein the data packet includes service header information identifying the first service path of the service chain, and requires processing by the service virtualized computing instance;

configuring a liveness check query and sending the liveness check query along with the data packet towards the service virtualized computing instance to cause a liveness check response from the service virtualized computing instance; and in response to detecting the liveness check response from the service virtualized computing instance, determining that the service virtualized computing instance is available;

otherwise, in response to detecting an absence of the liveness check response, generating and sending report information towards a second computer system, wherein the report information indicates that the service virtualized computing instance is unavailable to trigger a switch from the first service path to a second service path that excludes the service virtualized computing instance.

2. The method of claim 1, wherein configuring the liveness check query comprises:

configuring the liveness check query by setting a dedicated flag in the data packet, or metadata associated with the data packet, to cause the service virtualized computing instance to respond with the liveness check response regardless of whether data packet is dropped.

3. The method of claim 1, wherein configuring the liveness check query comprises:

configuring the liveness check query using a service insertion proxy that is associated by the service virtualized computing instance.

4. The method of claim 3, wherein configuring the liveness check query comprises:

configuring the liveness check query to include a sequence number for the service insertion proxy to identify the liveness check query to which the service virtualized computing instance is responding.

5. The method of claim 1, wherein detecting the liveness check response comprises:

in response to detecting the liveness check response along with a processed data packet from the service virtualized computing instance, sending the processed data packet towards a next hop on the first service path, or a destination.

6. The method of claim 1, wherein generating and sending the report information comprises:

generating and sending the report information towards a management entity, being the second computer system, to cause the management entity to invalidate the first service path.

7. The method of claim 1, wherein generating and sending the report information comprises:

generating and sending the report information towards a source host, being the second computer system, to inform the source host that the service virtualized computing instance is unavailable.

8. A non-transitory computer-readable storage medium that includes a set of instructions which, in response to execution by a processor of a computer system, cause the processor to perform a method of service chaining with service path monitoring, wherein the method comprises:
  detecting a data packet that is being forwarded along a first service path of a service chain that includes the service virtualized computing instance, wherein the data packet includes service header information identifying the first service path of the service chain, and requires processing by the service virtualized computing instance;
  configuring a liveness check query and sending the liveness check query along with the data packet towards the service virtualized computing instance to cause a liveness check response from the service virtualized computing instance; and
  in response to detecting the liveness check response from the service virtualized computing instance, determining that the service virtualized computing instance is available;
  otherwise, in response to detecting an absence of the liveness check response, generating and sending report information towards a second computer system, wherein the report information indicates that the service virtualized computing instance is unavailable to trigger a switch from the first service path to a second service path that excludes the service virtualized computing instance.

9. The non-transitory computer-readable storage medium of claim 8, wherein configuring the liveness check query comprises:
  configuring the liveness check query by setting a dedicated flag in the data packet, or metadata associated with the data packet, to cause the service virtualized computing instance to respond with the liveness check response regardless of whether data packet is dropped.

10. The non-transitory computer-readable storage medium of claim 8, wherein configuring the liveness check query comprises:
  configuring the liveness check query using a service insertion proxy that is associated by the service virtualized computing instance.

11. The non-transitory computer-readable storage medium of claim 10, wherein configuring the liveness check query comprises:
  configuring the liveness check query to include a sequence number for the service insertion proxy to identify the liveness check query to which the service virtualized computing instance is responding.

12. The non-transitory computer-readable storage medium of claim 8, wherein detecting the liveness check response comprises:
  in response to detecting the liveness check response along with a processed data packet from the service virtualized computing instance, sending the processed data packet towards a next hop on the first service path, or a destination.

13. The non-transitory computer-readable storage medium of claim 8, wherein generating and sending the report information comprises:
  generating and sending the report information towards a management entity, being the second computer system, to cause the management entity to invalidate the first service path.

14. The non-transitory computer-readable storage medium of claim 8, wherein generating and sending the report information comprises:
  generating and sending the report information towards a source host, being the second computer system, to inform the source host that the service virtualized computing instance is unavailable.

15. A computer system, being a first computer system, comprising:
  a processor; and
  a non-transitory computer-readable medium having stored thereon instructions that, when executed by the processor, cause the processor to:
    detect a data packet that is being forwarded along a first service path of a service chain that includes a service virtualized computing instance, wherein the data packet includes service header information identifying the first service path of the service chain, and requires processing by the service virtualized computing instance;
    cause the processor to a liveness check query and sending the liveness check query along with the data packet towards the service virtualized computing instance to cause a liveness check response from the service virtualized computing instance; and
    in response to detecting the liveness check response from the service virtualized computing instance, determine that the service virtualized computing instance is available;
    otherwise, in response to detecting an absence of the liveness check response, generate and send report information towards a second computer system, wherein the report information indicates that the service virtualized computing instance is unavailable to trigger a switch from the first service path to a second service path that excludes the service virtualized computing instance.

16. The computer system method of claim 15, wherein the instructions for configuring the liveness check query cause the processor to:
  configure the liveness check query by setting a dedicated flag in the data packet, or metadata associated with the data packet, to cause the service virtualized computing instance to respond with the liveness check response regardless of whether data packet is dropped.

17. The computer system method of claim 15, wherein the instructions for configuring the liveness check query cause the processor to:
  configure the liveness check query using a service insertion proxy that is associated by the service virtualized computing instance.

18. The computer system method of claim 17, wherein the instructions for configuring the liveness check query cause the processor to:
  configure the liveness check query to include a sequence number for the service insertion proxy to identify the liveness check query to which the service virtualized computing instance is responding.

19. The computer system method of claim 15, wherein the instructions for detecting the liveness check response cause the processor to:
  in response to detecting the liveness check response along with a processed data packet from the service virtualized computing instance, send the processed data packet towards a next hop on the first service path, or a destination.

20. The computer system method of claim 15, wherein the instructions for generating and sending the report information cause the processor to:

generating and sending the report information towards a management entity, being the second computer system, to cause the management entity to invalidate the first service path.

21. The computer system method of claim 15, wherein the instructions for generating and sending the report information cause the processor to:
generate and send the report information towards a source host, being the second computer system, to inform the source host that the service virtualized computing instance is unavailable.

* * * * *